US009013774B2

(12) United States Patent
Ko

(10) Patent No.: US 9,013,774 B2
(45) Date of Patent: Apr. 21, 2015

(54) PROJECTION CONTROLLING METHOD AND MEMS PROJECTION APPARATUS

(71) Applicant: Lite-On IT Corporation, Taipei (TW)

(72) Inventor: Cheng-Da Ko, Hsinchu (TW)

(73) Assignee: Lite-On Technology Corpoation, Taipei (TW)

( * ) Notice: Subject to any disclaimer, the term of this patent is extended or adjusted under 35 U.S.C. 154(b) by 321 days.

(21) Appl. No.: 13/746,321

(22) Filed: Jan. 22, 2013

(65) Prior Publication Data

US 2014/0168738 A1 Jun. 19, 2014

(30) Foreign Application Priority Data

Dec. 19, 2012 (CN) .......................... 2012 1 0554864

(51) Int. Cl.
*G02B 26/08* (2006.01)

(52) U.S. Cl.
CPC .................................. *G02B 26/0833* (2013.01)

(58) Field of Classification Search
CPC ...... H04N 5/74; G02B 26/08; G02B 26/0833; G02B 26/10; G02B 27/0025; G02B 7/1821; G03B 21/14
USPC ..................... 359/199.1–199.4, 200.6–200.8, 359/213.1–214.1, 224.1–224.2, 298
See application file for complete search history.

(56) References Cited

FOREIGN PATENT DOCUMENTS

JP 2008-249797 * 10/2008

* cited by examiner

*Primary Examiner* — James Phan
(74) *Attorney, Agent, or Firm* — Jianq Chyun IP Office

(57) ABSTRACT

A projection controlling method for controlling a MEMS scanning mirror to repeatedly scan an image light on a surface and form a projection image is provided. A resonance frequency of the MEMS scanning mirror which swings around a first swing axis is detected and provided to a filter unit as a parameter of a filtering process. A first periodic control signal with a first frequency and a plurality of harmonic components is generated. The harmonic component with the resonance frequency is filtered from the first periodic control signal by the filter unit. The filtered first periodic control signal is provided to the MEMS scanning mirror to control the MEMS scanning mirror to swing around the first swing axis according to the first frequency and to scan the image light on the surface back and forth along a first direction. A MEMS projection apparatus is also provided.

13 Claims, 4 Drawing Sheets

PROJECTION CONTROLLING METHOD AND MEMS PROJECTION APPARATUS

CROSS-REFERENCE TO RELATED APPLICATION

This application claims the priority benefit of China application serial no. 201210554864.9, filed on Dec. 19, 2012. The entirety of the above-mentioned patent application is hereby incorporated by reference herein and made a part of this specification.

BACKGROUND OF THE INVENTION

1. Field of the Invention

The invention generally relates to a projection controlling method and a microelectromechanical systems (MEMS) projection apparatus, and more particularly, to a projection controlling method and a MEMS projection apparatus using a MEMS scanning mirror.

2. Description of Related Art

Microelectromechanical systems (MEMS) generally refers to a technology for developing and manufacturing electronic devices and mechanical structures by using microelectronic technologies and mechanical engineering technologies and miniaturizing related products. Nowadays, laser projection apparatus using MEMS scanning mirror is broadly adopted in smart phones and notebook computers and has gradually become one of the most indispensable components of portable audio/video apparatuses thanks to its small volume and low power consumption.

Generally, a laser projection apparatus projects an image light and forms an image on a screen through its MEMS scanning mirror. While operating a MEMS scanning mirror, the MEMS scanning mirror is respectively controlled by different control signals with corresponding swing frequencies in different scanning directions of the image light on the screen. For example, if the scanning frequency of the image light in the vertical direction of the screen is 60 Hz, the swing frequency of the MEMS scanning mirror in the corresponding direction (for example, the vertical direction) should also be 60 Hz. Thus, the control signal should be a periodic wave signal of 60 Hz in order to achieve the desired image quality.

However, a MEMS scanning mirror has its own resonance frequency. Thus, when a periodic wave signal is input for controlling the MEMS scanning mirror, the MEMS scanning mirror produces a corresponding response to a harmonic component having the resonance frequency in the periodic wave signal, so that bright lines will be produced in the projection image when the image light scans due to the uneven swing speed of the MEMS scanning mirror. Thereby, how to resolve the problem of bright lines and achieve an optimal projection quality is one of the major subjects in the industry.

SUMMARY OF THE INVENTION

Accordingly, the invention is directed to a projection controlling method, in which a periodic control signal is adjusted to allow a microelectromechanical systems (MEMS) scanning mirror to work stably and to achieve an optimal image quality.

The invention is directed to a MEMS projection apparatus, in which a detection unit and a filter unit is utilized for adjusting a periodic control signal to control a MEMS scanning mirror, so as to achieve an optimal image quality.

An embodiment of the invention provides a projection controlling method for controlling a MEMS scanning mirror. The MEMS scanning mirror scans an image light to perform repeated scanning operations on a surface to form a projection image. The projection controlling method includes following steps. To detect a resonance frequency of the MEMS scanning mirror when the MEMS scanning mirror swings around a first swing axis with a plurality of frequencies. The resonance frequency is provided to a filter unit as a parameter of a filtering process. A first periodic control signal with a first frequency is generated, wherein the first periodic control signal has a plurality of harmonic components. The first periodic control signal is filtered by the filter unit, wherein the filter unit filters the harmonic component with the resonance frequency out of the first periodic control signal according to the resonance frequency provided to the filter unit. The filtered first periodic control signal is provided to the MEMS scanning mirror to control the MEMS scanning mirror to swing around the first swing axis according to the first frequency, so as to allow the image light to scan the surface back and forth along a first direction.

According to an embodiment of the invention, the step of detecting the resonance frequency of the MEMS scanning mirror further includes following steps. A plurality of periodic waves with different frequencies are sequentially provided to the MEMS scanning mirror. When the MEMS scanning mirror swings around the first swing axis according to the frequencies of the periodic waves, swing amplitude variations of the MEMS scanning mirror are detected, and the resonance frequency is obtained.

According to an embodiment of the invention, the periodic waves are a plurality of sine waves with different frequencies.

According to an embodiment of the invention, the first periodic control signal is a triangular wave or a sawtooth wave.

According to an embodiment of the invention, the projection controlling method further includes following step. A second periodic control signal with a second frequency is provided to the MEMS scanning mirror to control the MEMS scanning mirror to swing around a second swing axis according to the second frequency, so as to allow the image light to scan the surface back and forth along a second direction.

According to an embodiment of the invention, the filter unit is a notch filter, and the resonance frequency is a center frequency of the notch filter.

An embodiment of the invention provides a MEMS projection apparatus for projecting an image light on a surface to form a projection image. The MEMS projection apparatus includes a MEMS scanning mirror, a detection unit, a first control signal generator, and a filter unit. The MEMS scanning mirror scans the image light to perform repeated scanning operations on the surface to form the projection image. The detection unit detects a resonance frequency of the MEMS scanning mirror when the MEMS scanning mirror swings around a first swing axis with a plurality of frequencies. The filter unit is coupled to the MEMS scanning mirror and the detection unit. The filter unit receives the resonance frequency from the detection unit as a parameter of a filtering process. The first control signal generator is coupled to the filter unit. The first control signal generator generates and provides a first periodic control signal with a first frequency to the MEMS scanning mirror wherein the first periodic control signal has a plurality of harmonic components. The filter unit receives the first periodic control signal and filters the harmonic component with the resonance frequency out of the first periodic control signal to control the MEMS scanning mirror to swing around the first swing axis according to the first frequency, so as to allow the image light to scan the surface back and forth along a first direction.

According to an embodiment of the invention, the filter unit includes a notch filter and a low-pass filter. The notch filter filters out the harmonic component with the resonance frequency, and the low-pass filter filters out a part of the harmonic components, where the resonance frequency is a center frequency of the notch filter.

According to an embodiment of the invention, the first periodic control signal is a triangular wave or a sawtooth wave.

According to an embodiment of the invention, the MEMS projection apparatus further includes a periodic wave generator. The periodic wave generator sequentially provides a plurality of periodic waves with different frequencies to the MEMS scanning mirror. The MEMS scanning mirror swings around the first swing axis according to the frequencies of the periodic waves. The detection unit detects swing amplitude variations of the MEMS scanning mirror and obtains the resonance frequency.

According to an embodiment of the invention, the periodic waves are a plurality of sine waves with different frequencies.

According to an embodiment of the invention, the MEMS projection apparatus further includes a multiplexer. The multiplexer is coupled to the filter unit, the periodic wave generator, and the MEMS scanning mirror. The multiplexer sequentially provides the periodic waves or provides the first periodic control signal to the MEMS scanning mirror.

According to an embodiment of the invention, the periodic wave generator further provides a second periodic control signal with a second frequency to the MEMS scanning mirror to control the MEMS scanning mirror to swing around a second swing axis according to the second frequency, so as to allow the image light to scan the surface back and forth along a second direction.

As described above, in a projection controlling method provided by the invention, first, to detect a resonance frequency of a MEMS scanning mirror when the MEMS scanning mirror swings around a first swing axis with a plurality of frequencies. The resonance frequency of the MEMS scanning mirror can be detected by inputting a plurality of periodic waves with different frequencies to the MEMS scanning mirror and observing the swing amplitude variations of the MEMS scanning mirror. The resonance frequency is provided to a filter unit as a parameter of a filtering process. The filter unit performs the filtering process on a first periodic control signal for controlling the MEMS scanning mirror to filter out the harmonic component with the resonance frequency from the first periodic control signal. Thus, when the MEMS scanning mirror projects an image light, it is not interfered by the harmonic component with the resonance frequency, therefore it can smoothly scan a surface and provide a better projection image quality.

Additionally, in a MEMS projection apparatus provided by the invention, the first periodic control signal is filtered out the harmonic component with the resonance frequency from the first periodic control signal via a detection unit and a filter unit, the MEMS projection apparatus provides a better projection image quality.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
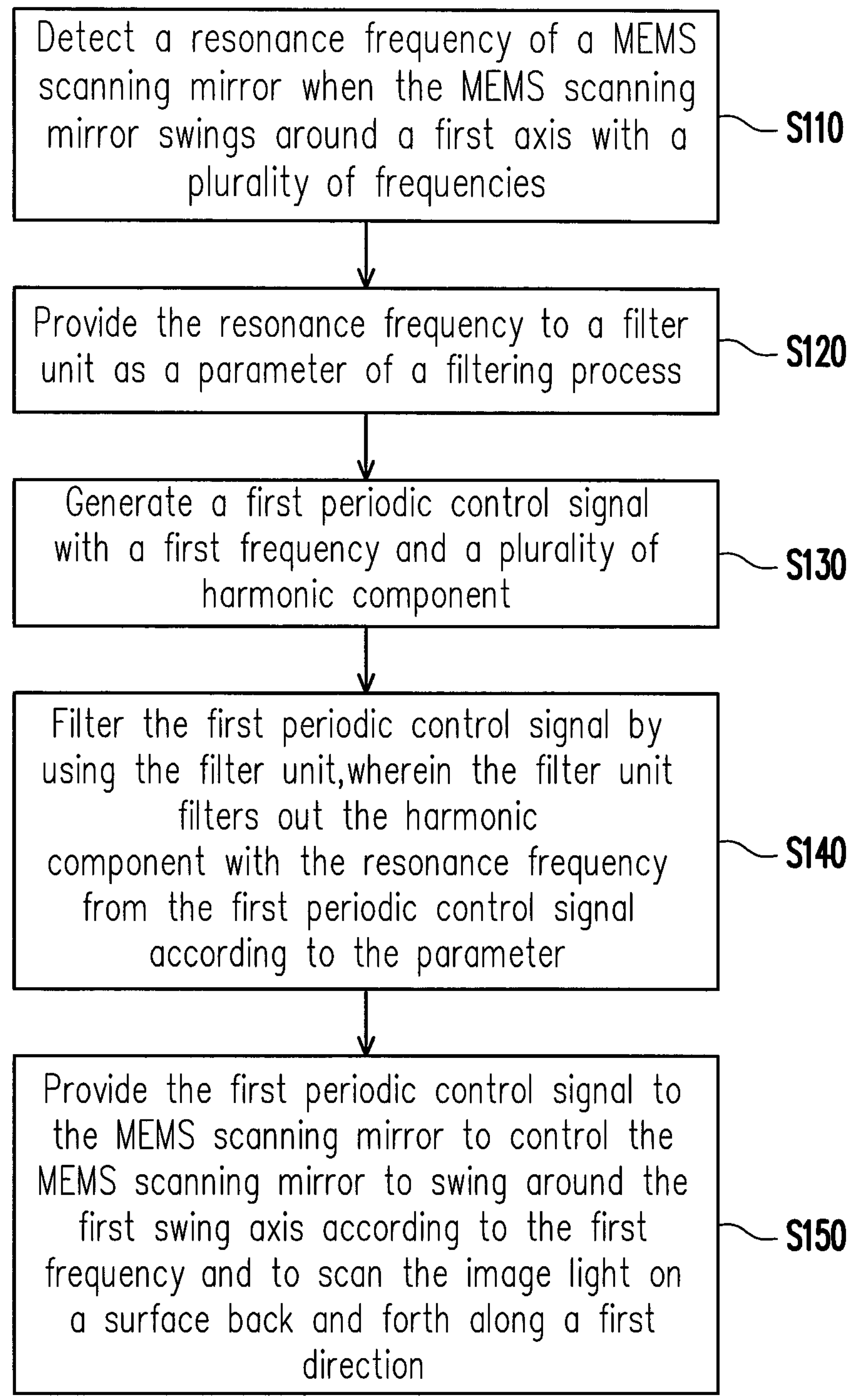
FIG. 1 is a flowchart of a projection controlling method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In an embodiment of the invention, a projection controlling method is provided for controlling a microelectromechanical systems (MEMS) scanning mirror. The MEMS scanning mirror swings to scan an image light onto a surface and performs repeated scanning operations on the surface to form a projection image. FIG. 1 is a flowchart of a projection controlling method according to an embodiment of the invention. Referring to FIG. 1, in step S110, to detect a resonance frequency of a MEMS scanning mirror when the MEMS scanning mirror swings around a first swing axis with a plurality of frequencies. In step S120, the resonance frequency is provided to a filter unit as a parameter of a filtering process. In step S130, a first periodic control signal with a first frequency and a plurality of harmonic components is generated. In step S140, the first periodic control signal is filtered by the filter unit. Herein the filter unit filters out the harmonic component with the resonance frequency from the first periodic control signal according to aforementioned parameter. In the last step S150, the first periodic control signal is provided to the MEMS scanning mirror to control the MEMS scanning mirror to swing around the first swing axis according to the first frequency, so as to scan the image light on a surface back and forth along a first direction.

Figure 2:
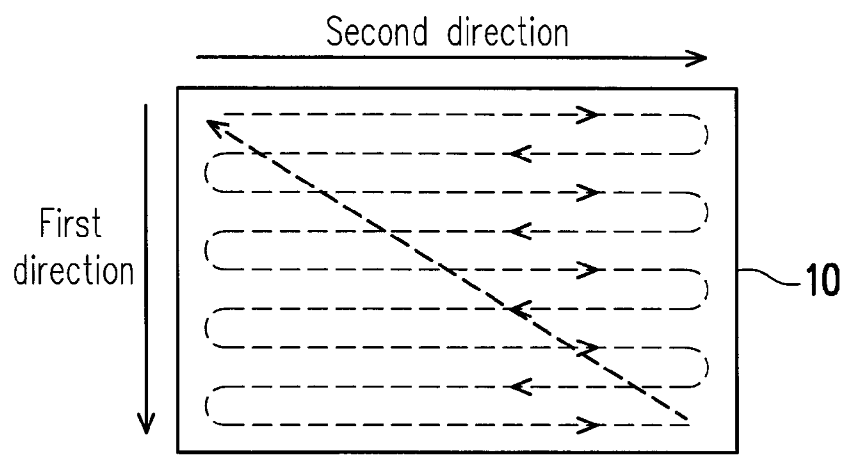
FIG. 2 is a projection schematic diagram of an image light according to an embodiment of the invention.

To be specific, in the projection controlling method, an image light is projected onto a surface for displaying images by swinging a MEMS scanning mirror, and repeated scanning operations are performed to form a projection image. FIG. 2 is a projection schematic diagram of an image light according to an embodiment of the invention. Referring to FIG. 2, the image light scans a surface 10 to form a projection image under the control of a MEMS scanning mirror. Generally, the swing direction of the MEMS scanning mirror is corresponding to the projection direction of the image light on the surface 10. In the present embodiment, when the MEMS scanning mirror swings around a first swing axis, the image light moves on the surface 10 back and forth along a first direction, so as to accomplish the projection purpose. Moreover, when the MEMS scanning mirror swings around a second swing axis, the image light scans and projects on the surface 10 along a second direction.

By controlling the swing frequency of the MEMS scanning mirror, the image light scans the surface 10 along a desired scanning trace. As shown in FIG. 2, the image light moves faster in the second direction than in the first direction. In other words, the image light can produce the scanning trace illustrated in FIG. 2 as long as the swing frequency (for example, 60 Hz) of the MEMS scanning mirror around the first swing axis is lower than the swing frequency (for example, 18000 Hz) of the MEMS scanning mirror around the second swing axis. The scanning way of the image light on the surface 10 is not limited to that described in foregoing embodiment, and different scanning traces may be produced to meet the design of product.

Based on the embodiment described above, in the projection controlling method, periodic control signals are input to control the MEMS scanning mirror, so as to respectively control the movement of the image light in the first direction and the second direction. Referring to FIG. 1 again, the first periodic control signal generated in step S130 is a periodic wave with a first frequency, the MEMS scanning mirror swings around the first swing axis in response to the frequency, waveform, and amplitude of the first periodic control signal, and accordingly the image light scans the surface 10 along the first direction.

Figure 3:
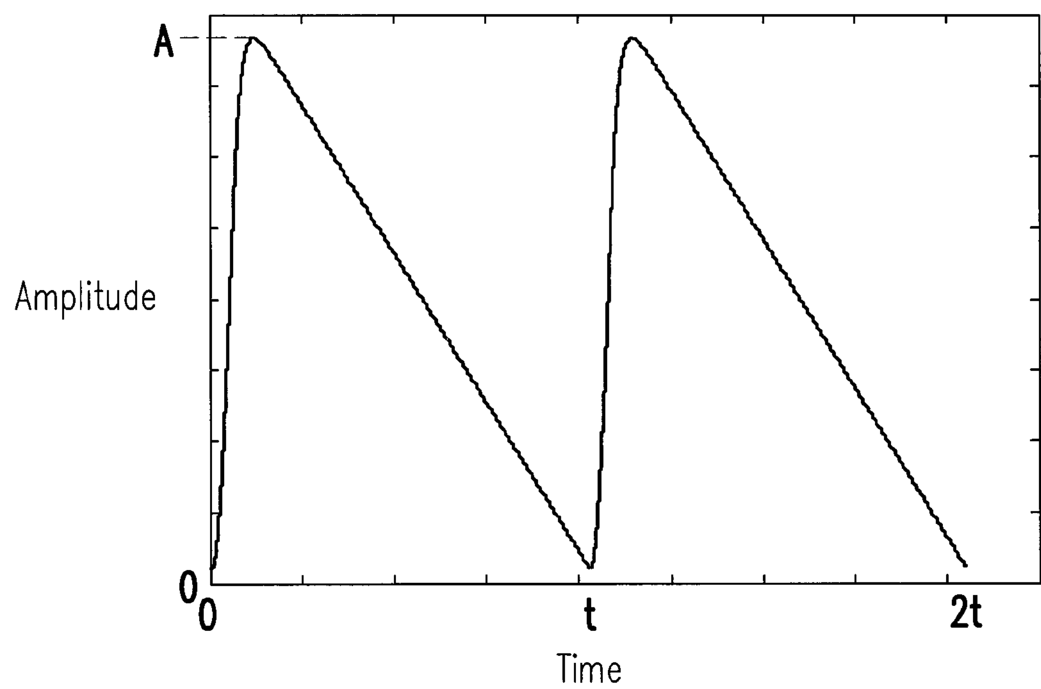
FIG. 3 is a schematic diagram of a first periodic control signal according to an embodiment of the invention.

It should be noted that in FIG. 2, when the image light scans to one end along the first direction, it needs to quickly return to the other end of the surface 10 to re-scan the surface 10. Thus, regarding the waveform of the first periodic control signal for controlling the MEMS scanning mirror, the speed for reaching the level of crest is different from the speed for reaching the level of trough. FIG. 3 is a schematic diagram of a first periodic control signal according to an embodiment of the invention. Referring to FIG. 3, the first periodic control signal is a periodic triangular wave, the maximum amplitude thereof is A, and the period thereof is t. Because the time for the wave to reach the trough from the crest is different from the time for the wave to reach the crest from the trough, the MEMS scanning mirror swings back and forth at different speeds, so that the image light can completely scan the surface 10 along the first direction and instantly return to one end of the surface 10 from the other end thereof to re-scan the surface 10. In addition, the projection frequency of the image light along the first direction is the frame rate of the projection image. The first periodic control signal is not limited to a triangular wave, and in other embodiments, the first periodic control signal may also be a sawtooth wave or any other type of wave.

A non-sine periodic wave is usually composed of a plurality of harmonic components. For example, besides a sine wave of 60 Hz, a triangular wave of 60 Hz further includes a plurality of harmonic components with their frequencies as multiple of 60 Hz, such as 120 Hz, 180 Hz, and 240 Hz. Regarding the embodiment described above, when a triangular wave of 60 Hz is input as the first periodic control signal to control the MEMS scanning mirror to swing around the first swing axis, because the MEMS scanning mirror has its own resonance frequency, the harmonic component in the first periodic control signal which has a frequency similar to the resonance frequency of the MEMS scanning mirror will cause the MEMS scanning mirror to sway. As a result, the image light will not move on the surface as smoothly as expected along the first direction and a drifting effect thereof will be produced. Accordingly, bright lines will be produced on the projection image.

Referring to FIG. 1, to resolve the problem mentioned above, in step S110 of the projection controlling method, first, to detect the resonance frequency of the MEMS scanning mirror when the MEMS scanning mirror swings around the first swing axis with a plurality of frequencies. Besides, in step S120, the resonance frequency is input to a filter unit as a parameter of a filtering process. Herein the filter unit is to perform the filtering process on the first periodic control signal.

Figure 4A:
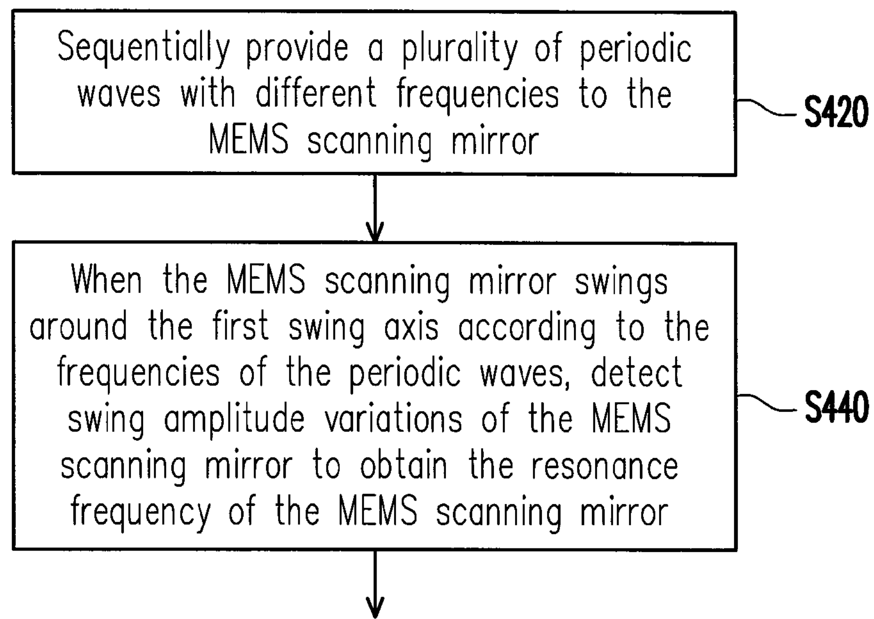
FIG. 4A is a flowchart illustrating how to detect a resonance frequency of a microelectromechanical systems (MEMS) scanning mirror according to an embodiment of the invention.

FIG. 4A is a flowchart illustrating how to detect a resonance frequency of a MEMS scanning mirror according to an embodiment of the invention. Referring to FIG. 4A, in step S420, a plurality of periodic waves with different frequencies are sequentially provided to the MEMS scanning mirror. Next, in step S440, when the MEMS scanning mirror swings around the first swing axis according to the frequencies of the periodic waves, swing amplitude variations of the MEMS scanning mirror are detected to obtain the resonance frequency of the MEMS scanning mirror when the MEMS scanning mirror swings around the first swing axis.

Figure 4B:
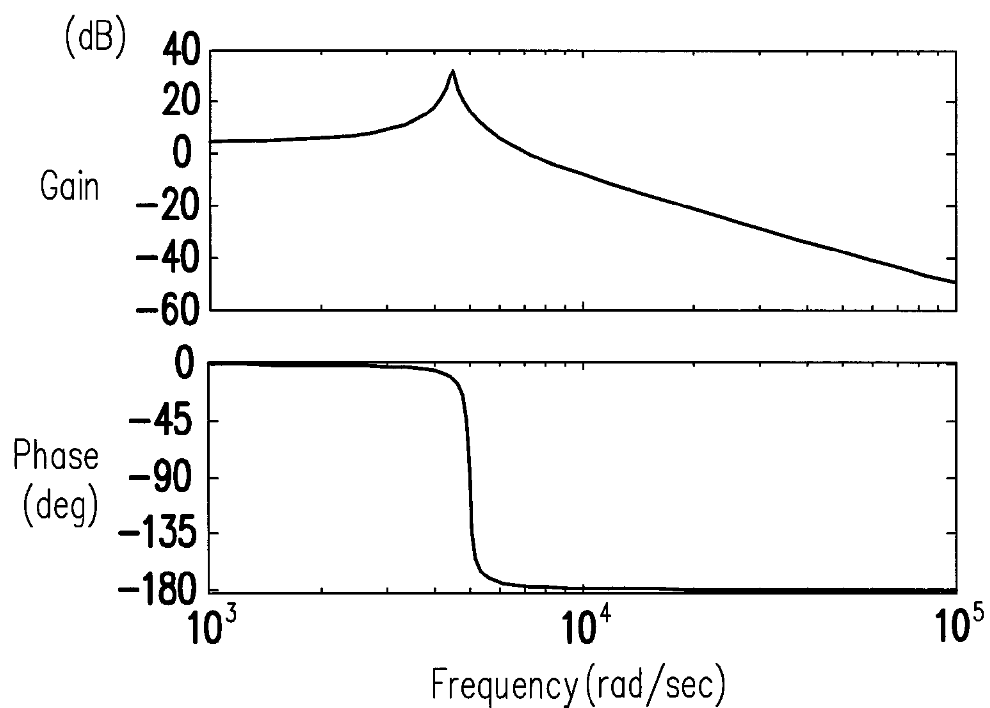
FIG. 4B is a frequency response Bode plot of a MEMS scanning mirror according to an embodiment of the invention.

FIG. 4B is a frequency response Bode plot of a MEMS scanning mirror according to an embodiment of the invention. Referring to FIG. 4B, to be specific, if the frequency of one of the periodic waves is close to or the same as the resonance frequency of the MEMS scanning mirror swinging around the first swing axis, as indicated by the crest in FIG. 4B, the MEMS scanning mirror achieves the greatest gain in its swing amplitude, so that the swing amplitude of the MEMS scanning mirror is greater than other amplitudes when other periodic waves are input. Thus, when the MEMS scanning mirror sequentially receives different periodic waves, the corresponding swing amplitudes of the MEMS scanning mirror swings around the first swing axis are recorded and compared to obtain the resonance frequency wherein the resonance frequency is corresponding to the maximum amplitude gain. In other words, the periodic wave that allows the MEMS scanning mirror to have the maximum amplitude gain has a frequency closest to (or the same as) the resonance frequency of the MEMS scanning mirror swinging around the first swing axis. In the projection controlling method provided by an embodiment of the invention, the periodic waves provided in step S420 are a plurality of sine waves with different frequencies, and these sine waves are used for detecting the resonance frequency.

Referring to FIG. 1 again, in step S140, the first periodic control signal is filtered by the filter unit. The filter unit filters out the harmonic component with the resonance frequency from the first periodic control signal according to the detected resonance frequency. In step S150, the filtered first periodic control signal is provided to the MEMS scanning mirror. The filter unit may be a notch filter, and the resonance frequency is a center frequency of the notch filter. After the harmonic component with the resonance frequency is filtered out, the first periodic control signal still has harmonic components with a first frequency and other non-resonance frequency. The MEMS scanning mirror receives the filtered first periodic control signal and swings around the first swing axis according to the first frequency, and the image light scans the surface back and forth along the first direction. In the projection controlling method, a second periodic control signal with a second frequency is further provided to the MEMS scanning mirror to control the MEMS scanning mirror to swing around a second swing axis according to the second frequency, so as to allow the image light to scan the surface back and forth along a second direction.

Figure 5:
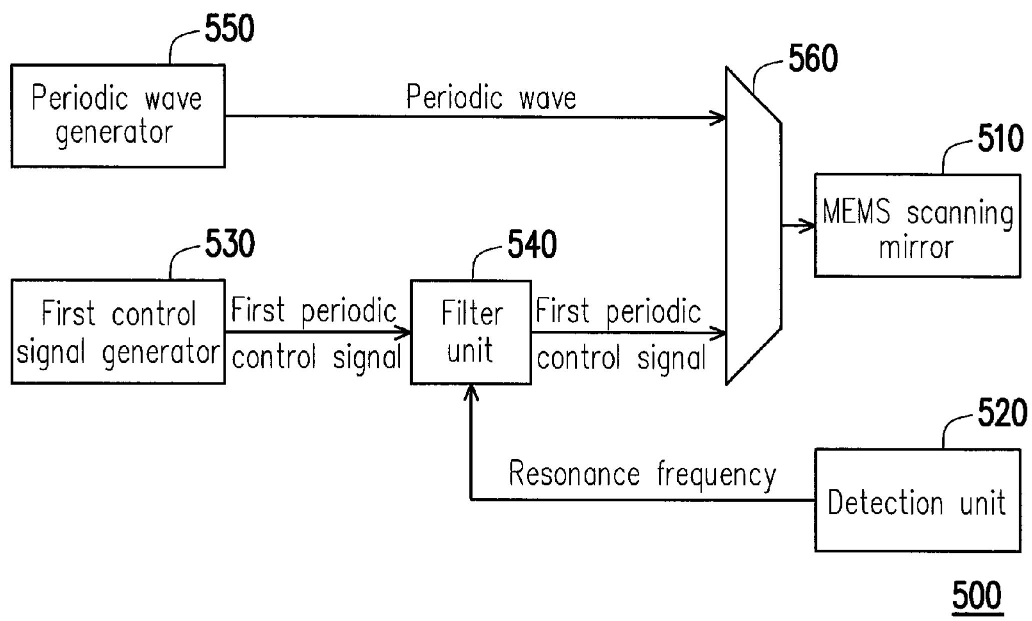
FIG. 5 is a schematic diagram of a MEMS projection apparatus according to an embodiment of the invention.

FIG. 5 is a schematic diagram of a MEMS projection apparatus according to an embodiment of the invention. Referring to FIG. 5, the MEMS projection apparatus 500 includes a MEMS scanning mirror 510, a detection unit 520, a first control signal generator 530, and a filter unit 540. The MEMS scanning mirror 510 scans an image light to perform repeated scanning operations on a surface to form a projection image. The detection unit 520 detects the resonance frequency of the MEMS scanning mirror 510 when the MEMS scanning mirror 510 swings around a first swing axis with a plurality of frequencies. The filter unit 540 is respectively coupled to the MEMS scanning mirror 510 and the detection unit 520. The filter unit 540 receives the resonance frequency from the detection unit 520 as a parameter of a filtering process. The first control signal generator 530 generates a first periodic control signal with a first frequency for the MEMS scanning mirror 510. However, the filter unit 540 receives the first periodic control signal and filters out the harmonic component with the resonance frequency from the first periodic control signal, so as to control the MEMS scanning mirror 510 to swing around the first swing axis according to the first frequency and to scan the image light on the surface back and forth along a first direction. The first periodic control signal may be a triangular wave or a sawtooth wave with a plurality of harmonic components.

To be specific, the MEMS projection apparatus 500 adjusts the first periodic control signal through the detection unit 520 and the filter unit 540 so that the first periodic control signal for controlling the MEMS scanning mirror 510 contains no harmonic component to affect the operation of the MEMS scanning mirror 510. In the present embodiment, the MEMS projection apparatus 500 further includes a periodic wave generator 550, and the resonance frequency of the MEMS scanning mirror 510 is detected through the periodic wave generator 550, which will be explained in detail below.

The periodic wave generator 550 sequentially provides a plurality of periodic waves with different frequencies to the MEMS scanning mirror 510, and the MEMS scanning mirror 510 swings around the first swing axis according to the frequencies of the periodic waves. The periodic waves may be a plurality of sine waves with different frequencies. The detection unit 520 detects swing amplitude variations of the MEMS scanning mirror and obtains the resonance frequency of the MEMS scanning mirror 510 when the MEMS scanning mirror 510 swings around the first swing axis with a plurality of frequencies. The detection unit 520 may detect the swing amplitude variations of the MEMS scanning mirror 510 through a piezoelectric element (not shown), record and obtain the resonance frequency of the MEMS scanning mirror 510 through a crest detector (not shown) and a digital signal processor (not shown).

Figure 6:
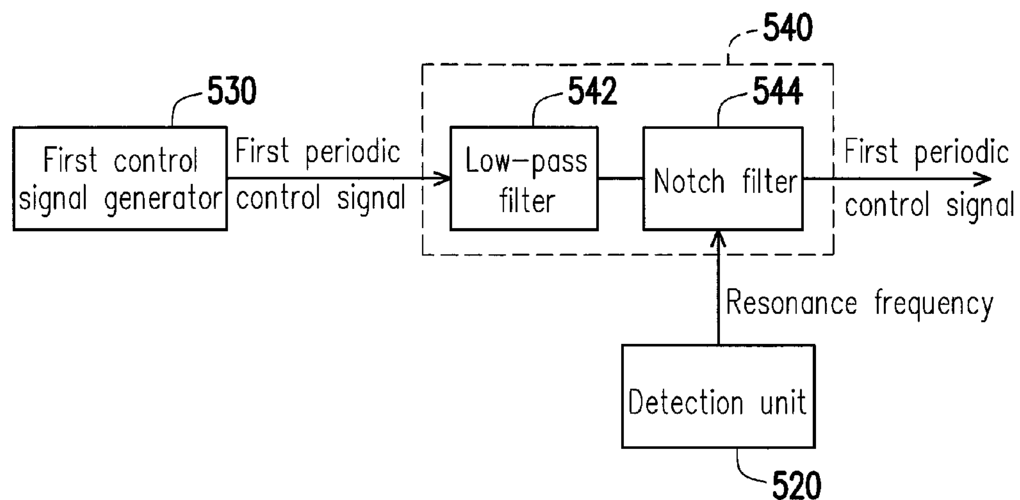
FIG. 6 is a schematic diagram of a filter unit according to an embodiment of the invention.

The filter unit 540 performs a filtering process on the first periodic control signal according to the detection result of the detection unit 520. In other words, the detection unit 520 inputs the resonance frequency to the filter unit 540 as a parameter of the filtering process. FIG. 6 is a schematic diagram of the filter unit 540 according to an embodiment of the invention. Referring to FIG. 6, the filter unit 540 includes a low-pass filter 542 and a notch filter 544. The resonance frequency detected by the detection unit 520 is sent back to the notch filter 544 in the filter unit 540 and is set as the center frequency in the filtering band of the notch filter 544, so that the harmonic component with the resonance frequency in the first periodic control signal can be filtered out. In addition, the low-pass filter 542 is configured to filter out some of the harmonic components (for example, those harmonic components with higher frequencies) to prevent such harmonic components from affecting the swing frequency and swing amplitude of the MEMS scanning mirror 510 when the MEMS scanning mirror 510 swings around the first swing axis.

Referring to FIG. 5 again, in the present embodiment, the MEMS projection apparatus 500 further includes a multiplexer 560. The multiplexer 560 is coupled to the filter unit 540, the periodic wave generator 550, and the MEMS scanning mirror 510. The multiplexer 560 determines whether to sequentially provide the periodic waves or provide the first periodic control signal to the MEMS scanning mirror 510 so as to prevent the signals from interfering each other. However, the invention is not limited thereto, and the multiplexer 560 can be disposed according to the actual requirement.

In another embodiment of the invention, the periodic wave generator 550 further provides a second periodic control signal having a second frequency to the MEMS scanning mirror 510 to control the MEMS scanning mirror 510 to swing around a second swing axis according to the second frequency and to scan the image light on the surface back and forth along a second direction. In the present embodiment, the second periodic control signal can be input to the MEMS scanning mirror 510 via another circuit route (not shown). The first periodic control signal and the second periodic control signal respectively control the MEMS scanning mirror 510 to swing around the first swing axis and the second swing axis, so as to scan the image light to perform repeated scanning operations on the surface 10 (as shown in FIG. 2) and form a projection image. In other embodiments, a second control signal generator (not shown) may be further adopted to generate a second periodic control signal and input the second periodic control signal to the MEMS scanning mirror 510 to control the swing of the MEMS scanning mirror 510.

As described above, in the projection controlling method provided by an embodiment of the invention, first, to detect a resonance frequency of a MEMS scanning mirror when the MEMS scanning mirror swings around a first swing axis with a plurality of frequencies, and the harmonic component with the resonance frequency is filtered out of a first periodic control signal. When the MEMS scanning mirror swings around the first swing axis and an image light scans a surface along a first direction, because the first periodic control signal is already filtered, the MEMS scanning mirror can scan the surface and form a projection image according to desired frequency and speed, so that no bright line will be produced in the projection image and the projection quality is improved. Additionally, in a MEMS projection apparatus provided by an embodiment of the invention, the harmonic component with the resonance frequency is filtered out from the first periodic control signal to maintain the image quality of the MEMS projection apparatus.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection controlling method, for controlling a microelectromechanical systems (MEMS) scanning mirror, wherein the MEMS scanning mirror scans an image light to perform repeated scanning operations on a surface to form a projection image, the projection controlling method comprising:

detecting a resonance frequency of the MEMS scanning mirror when the MEMS scanning mirror swings around a first swing axis with a plurality of frequencies;

providing the resonance frequency to a filter unit as a parameter of a filtering process;

generating a first periodic control signal with a first frequency, wherein the first periodic control signal has a plurality of harmonic components;

filtering the first periodic control signal by using the filter unit, wherein the filter unit filters the harmonic component with the resonance frequency out of the first periodic control signal according to the parameter; and providing the filtered first periodic control signal to the MEMS scanning mirror to control the MEMS scanning mirror to swing around the first swing axis according to the first frequency, so as to scan the image light on the surface back and forth along a first direction.

2. The projection controlling method according to claim 1, wherein the step of detecting the resonance frequency of the MEMS scanning mirror further comprises:

sequentially providing a plurality of periodic waves with different frequencies to the MEMS scanning mirror; and when the MEMS scanning mirror swings around the first swing axis according to the frequencies of the periodic waves, detecting swing amplitude variations of the MEMS scanning mirror, and obtaining the resonance frequency.

3. The projection controlling method according to claim 2, wherein the periodic waves are a plurality of sine waves with different frequencies.

4. The projection controlling method according to claim 1, wherein the first periodic control signal is a triangular wave or a sawtooth wave.

5. The projection controlling method according to claim 1 further comprising:

providing a second periodic control signal with a second frequency to the MEMS scanning mirror to control the MEMS scanning mirror to swing around a second swing axis according to the second frequency, so as to scan the image light on the surface back and forth along a second direction.

6. The projection controlling method according to claim 1, wherein the filter unit is a notch filter, and the resonance frequency is a center frequency of the notch filter.

7. A microelectromechanical systems (MEMS) projection apparatus, for projecting an image light on a surface to form a projection image, the MEMS projection apparatus comprising:

a MEMS scanning mirror, scanning the image light to perform repeated scanning operations on the surface to form the projection image;

a detection unit, detecting a resonance frequency of the MEMS scanning mirror when the MEMS scanning mirror swings around a first swing axis with a plurality of frequencies;

a filter unit, coupled to the MEMS scanning mirror and the detection unit, and receiving the resonance frequency from the detection unit as a parameter of a filtering process; and a first control signal generator, coupled to the filter unit, generating a first periodic control signal with a first frequency, and providing the first periodic control signal to the MEMS scanning mirror, wherein the first periodic control signal has a plurality of harmonic components, the filter unit receives the first periodic control signal and filters the harmonic component with the resonance frequency out of the first periodic control signal to control the MEMS scanning mirror to swing around the first swing axis according to the first frequency, so as to scan the image light on the surface back and forth along a first direction.

8. The MEMS projection apparatus according to claim 7, wherein the filter unit comprises:

a notch filter, filtering out the harmonic component with the resonance frequency, wherein the resonance frequency is a center frequency of the notch filter; and a low-pass filter, filtering out a part of the harmonic components.

9. The MEMS projection apparatus according to claim 7, wherein the first periodic control signal is a triangular wave or a sawtooth wave.

10. The MEMS projection apparatus according to claim 7 further comprising:

a periodic wave generator, sequentially providing a plurality of periodic waves with different frequencies to the MEMS scanning mirror, wherein the MEMS scanning mirror swings around the first swing axis according to the frequencies of the periodic waves, and the detection unit detects swing amplitude variations of the MEMS scanning mirror and obtains the resonance frequency.

11. The MEMS projection apparatus according to claim 10, wherein the periodic waves are a plurality of sine waves having different frequencies.

12. The MEMS projection apparatus according to claim 10 further comprising:

a multiplexer, coupled to the filter unit, the periodic wave generator, and the MEMS scanning mirror, wherein the multiplexer sequentially provides the periodic waves or provides the first periodic control signal to the MEMS scanning mirror.

13. The MEMS projection apparatus according to claim 10, wherein the periodic wave generator further provides a second periodic control signal with a second frequency to the MEMS scanning mirror to control the MEMS scanning mirror to swing around a second swing axis according to the second frequency, so as to scan the image light on the surface back and forth along a second direction.

* * * * *